Patented Dec. 6, 1932

1,889,945

UNITED STATES PATENT OFFICE

JOHANNES BRODE, OF LUDWIGSHAFEN-ON-THE-RHINE, AND ADOLF JOHANNSEN, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF MONOCARBOXYLIC ACIDS

No Drawing. Application filed April 21, 1928, Serial No. 271,972, and in Germany November 27, 1925.

The invention relates to improvements in the production of monocarboxylic acids by catalytically splitting off carbon dioxid from dicarboxylic acids or their anhydrides. In our copending application Ser. No. 149,520, filed November 19, 1926, of which this application is a continuation in part, we have suggested a method for carrying out this reaction in which the vapors of dicarboxylic acids or their anhydrides together with water vapor are passed over catalysts capable of splitting off carbon dioxid. As stated in the aforesaid application Ser. No. 149,520 the addition of water vapor may be omitted in case dicarboxylic acids themselves are employed. We have also shown in the said application that in the said process also the gas mixtures obtained in the catalytic oxidation of organic compounds to dicarboxylic acid anhydrides may directly be employed.

In the said process, however, it may occur that the efficiency of the catalysts employed diminishes gradually, but rather quickly, and this is especially the case when using crude initial materials in which case the efficiency of the catalysts may be lowered so rapidly that very low yields are obtained after only a short time of working.

We have found that this slackening of the efficiency of the catalysts in splitting off carbonic acid is due to certain impurities poisoning the catalyst. The most obnoxious impurities poisoning the catalyst are the sulfur compounds such as sulfuric acid or sulfur trioxid which are usally present in the products of the catalytic oxidation of organic compounds, which are hereinafter for the sake of brevity referred to as "intermediates". Sulfuric acid especially occurs as a strongly poisoning agent when the crude mixtures containing the anhydrides of dicarboxylic acids such as phthalic or maleic acid, obtained by the catalytic oxidation of crude commercial naphthalene or benzol, are directly employed for the production of monocarboxylic acids, such as benzoic or acrylic acid.

According to the present invention the activity of the catalysts is maintained for a very long time even when employing crude initial materials or intermediates by connecting a purifying stage with the said process of splitting off carbon dioxid. The removal of the sulfur compounds from the initial materials or intermediates is preferably performed by passing the vapors of the dicarboxylic acids or their anhydrides or gaseous mixtures containing the same, prior to acting upon them with the said catalysts, over purifying masses which are capable of absorbing or adsorbing compounds of sulfur. Masses suitable for this purpose are for example granulated pumice, earthenware sherds, silica gel, active carbon and the like; but other materials such as marble, calamine or iron turnings or others, which do not alter their shape at the temperatures required by the purifying process may also be used. The temperatures to be applied vary in accordance with properties of the material to be treated, but, in every case, they should be high enough, that no condensation of the dicarboxylic acids or their anhydrides occurs.

Particularly suitable purifying masses are the catalytic substances which have been used as the agents splitting off carbon dioxide and have already lost in efficiency by a very extended use or by becoming poisoned by the action of sulfur compounds. Such substances are still capable of absorbing large quantities of sulfur compounds although they are charged with such quantities of the same as to check their catalytic action.

A very efficient manner of working consits in contacting the said purifying mass in counter-current with the gaseous or vaporous mixtures of acids or anhydrides, so that the initial materials are first subjected to the purifying action of the exhausted catalytic material and only then to the catalytic action of fresh material.

Instead of removing the sulfur compounds from the intermediates the desulfurization may be applied by any known method to the initial materials from which the said intermediate products are obtained. Thus, crude naphthalene may be desulphurized for example by distillation in the presence of sodium, and then oxidized to phthalic anhydride, the resulting vapors of which are directly converted into benzoic acid. On working in this manner the efficiency of the catalyst is maintained for a considerably longer time than when crude naphthalene containing sulfur compounds is used as initial material.

The nature of this invention is further illustrated by the following examples, but the invention is not limited thereto.

Example 1

A mixture of air and naphthalene vapor is passed at an elevated temperature over a contact mass consisting of vanadium pentoxid, the temperature, the concentration and the time of contact being so controlled that a good yield of phthalic anhydride is obtained, avoiding as far as possible the formation of quinone-like substances. The hot gaseous reaction products containing water vapor leaving the oxidation catalyst are passed first over a purifying mass having a great surface, for example pumice stone, at a temperature of 360° C. and then over a catalyst containing zinc oxid either in compact particles or on a suitable carrier such as pumice stone. The gas mixture leaving the reaction chamber is cooled whereby simultaneously the mixture of air and naphthalene vapor newly introduced into the process may be partly preheated. Very good yields of benzoic acid are obtained together with small quantities of unchanged phthalic anhydride and traces of by-products of the reaction.

By fractionally separating the reaction products the bulk of the benzoic acid can be obtained directly as a white product of great purity.

Instead of zinc oxid, catalysts containing, besides zinc oxid, activating oxids of other metals may be employed with a still better result. Preferably the catalysts are prepared by spraying a solution of zinc nitrate or of a mixture of zinc nitrate and nitrates of other metals on slightly heated pumice stone and heating the catalyst thus formed to a temperature of 300° to 400° C. in a current of air. Instead of a mixture of air and naphthalene vapor a mixture of naphthalene vapor and oxygen-containing gas of another percentage in oxygen than air may be employed. Such a mixture is used for example when part of the gas mixture remaining after the reaction product is condensed, is reintroduced together with fresh air and naphthalene vapor into the process. Advantageously the carbon dioxid formed in the process is separated from the gas before it is reintroduced.

In the process as above described the oxidation of naphthalene or the conversion of intermediarily formed phthalic anhydride into benzoic acid or both processes may be carried out under elevated pressure. As initial material crude industrial naphthalene may be used.

Example 2

Vapors of phthalic acid or its anhydride in mixture with water vapor are passed at about 360° C. from below through a shaft furnace supplied from the top with a catalytic material splitting off carbon dioxid, and consisting, for example, of zinc oxid deposited on a carrier, the gases containing benzoic acid being drawn off above. Fresh catalytic material is fed in at the top continuously or periodically in accordance with the exhaustion of the catalyst, the exhausted material serving as a purifying mass on approaching the bottom and protecting the active catalyst in the upper part of the furnace against poisoning by sulfur compounds. The process described above allows of producing without special precautions monocarboxylic acids from crude industrial materials, such as the products containing sulfuric acid obtained by the oxidation of crude, sulfur containing naphthalene or benzene.

Example 3

A mixture of phthalic anhydride vapor with nitrogen or air and water vapor and containing small quantities of sulfuric acid vapor is passed at about 200° C. over pumice-grit and then at about 330° C. over a catalyst which consists of a homogeneous mixture of zinc oxid and aluminium oxid deposited on a carrier. By the action of the catalyst carbondioxid is split off, so that the phthalic anhydride is converted into benzoic acid.

The pumice-grit absorbs the sulfuric acid contained in the initial materials and protects the catalytic substance from being poisoned. On working in this manner, the activity of the valuable catalytic substance is maintained for a very long time, the cost of the cheap purifying medium being practically none in comparison with the value of the said advantage. The pumice-grit employed is capable of absorbing from about 20 to 25 per cent of its weight of sulfur trioxid, even when the concentration of sulfuric acid in the vaporous mixture of the initial materials attains a partial pressure of the range of only $10^{-2}$ millimetres (mercury gauge).

In a similar manner the vapors of crude maleic anhydride containing sulfuric acid, in mixture with water vapor or gases containing water vapor, can be converted into acrylic acid.

What we claim is:

1. In the production of monocarboxylic acids from a member of the group consisting of dicarboxylic acids and their anhydrides, contaminated with sulphur compounds, by treatment with catalysts capable of splitting off carbon dioxid, the step of converting the sulphur compounds in the initial material into a non-volatile form before subjecting the initial material in the vapour phase to the said catalytic treatment.

2. In the production of monocarboxylic acids from a member of the group consisting of dicarboxylic acids and their anhydrides, contaminated with sulphur compounds, by treatment with catalysts capable of splitting off carbon dioxid, the step of contacting the initial material, before the catalytic treatment, in the vapor state with an agent absorbing sulfur compounds.

3. In the production of monocarboxylic acids from the intermediates containing a dicarboxylic acid anhydride, contaminated with sulphur compounds, obtainable by catalytic oxidation of impure organic compounds by treatment of said intermediates with catalysts capable of splitting off carbon dioxid, the step of contacting the crude intermediates, before the catalytic treatment, in the vapor state with an agent absorbing sulfur compounds.

4. In the production of monocarboxylic acids from the intermediates containing a dicarboxylic acid anhydride, contaminated with sulphur compounds, obtainable by catalytic oxidation of impure organic compounds by treatment with catalysts capable of splitting off carbon dioxid, the step of contacting the gases resulting from said catalytic oxidation with an agent absorbing sulfur compounds before subjecting them to the catalytic treatment.

5. In the production of monocarboxylic acids from a member of the group consisting of dicarboxylic acids and their anhydrides, contaminated with sulphur compounds, by treatment with catalysts capable of splitting off carbon dioxid, the step of treating the initial material, before the catalytic treatment, in the vapor state at a temperature at which no deposition of the initial material occurs, in counter-current with an agent absorbing sulfur compounds.

6. In the production of monocarboxylic acids from a member of the group consisting of dicarboxylic acids and their anhydrides, contaminated with sulphur compounds, by treatment with catalysts capable of splitting off carbon dioxid, the step of treating the initial material, prior to the catalytic treatment, with a catalyst capable of splitting off carbon dioxid and reduced in its efficiency, to remove the sulphur compounds, at a temperature at which no deposition of the initial material occurs, and then contacting it with fresh catalyst at the reaction temperature.

7. The process of producing monocarboxylic acids from a member of the group consisting of dicarboxylic acids and their anhydrides, contaminated with sulphur compounds, which comprises passing a dicarboxylic acid vapor at a temperature between about 250° and 500° C. over a catalyst capable of splitting off carbon dioxid, the said catalyst being moved in counter-current to the reacting gases, so as to effect contact of said gases first with catalyst reduced in its efficiency of splitting off carbon dioxid, to remove the sulphur compounds, and then with fresh catalyst.

8. In the catalytic production of benzoic acid from impure phthalic anhydride, contaminated with sulphur compounds, the step of treating the initial material, before the catalytic treatment, in the vapor state with an agent absorbing sulfur compounds.

9. In the catalytic production of benzoic acid from impure phthalic anhydride, contaminated with sulphur compounds, the step of treating the initial material, before the catalytic treatment, in the vapor state with a catalyst reduced in its efficiency of splitting off carbonic acid, to remove the sulphur compounds, and then contacting it with fresh catalyst at the reaction temperature.

10. The process of producing benzoic acid from phthalic anhydride, contaminated with sulphur compounds, which comprises passing phthalic anhydride vapor and water vapor at between 250° and 500° C. over a catalyst capable of splitting off carbon dioxid, the said catalyst being moved in counter-current to the reacting gases, so as to effect contact of said gases first with catalyst reduced in its efficiency of splitting off carbon dioxid, to remove the sulphur compounds, and then with fresh catalyst.

11. In the production of benzoic acid from the intermediates containing phthalic anhydride, contaminated with sulphur compounds, obtainable by catalytic oxidation of impure naphthalene, by treatment with catalysts capable of splitting off carbon dioxid, the step of contacting the gases resulting from said catalytic oxidation with an agent absorbing sulfur compounds before subjecting them to the catalytic treatment.

12. In the catalytic production of benzoic acid from the intermediates containing phthalic anhydride, contaminated with sulphur compounds, obtainable by catalytic oxidation of impure naphthalene, by treatment with catalysts capable of splitting off carbon dioxid, the step of treating the gases resulting from said catalytic oxidation, prior to the catalytic treatment, with a catalyst capable of splitting off carbon dioxid which is reduced in its efficiency, to remove the sulphur compounds, at a temperature at which no deposition of the initial material occurs, and then contacting it with fresh catalyst at the reaction temperature.

13. The process of producing benzoic acid from the intermediates containing phthalic anhydride, contaminated with sulphur compounds, obtainable by the catalytic oxidation of impure naphthalene, by treatment with catalysts capable of splitting off carbon dioxid, which comprises passing the gases resulting from said catalytic oxidation at a temperature between about 250–450° C. over a catalyst capable of splitting off carbon dioxid, the said catalyst being moved in counter current to the reacting gases, so as to effect contact of said gases first with catalyst reduced in its efficiency of splitting off carbon dioxid, to remove the sulphur compounds, and then with fresh catalyst.

14. In the production of monocarboxylic acids by preparing dicarboxylic anhydrides by catalytic oxidation of organic compounds and treating said anhydrides with catalysts capable of splitting off carbon dioxid, the step of preventing poisoning of the catalyst splitting off carbon dioxide by converting the sulphur compounds and sulphur in the impure organic compounds to the subjected to the catalytic oxidation into a non-volatile form and then carrying out said catalytic oxidation in the vapour phase.

15. In the production of benzoic acid by preparing phthalic anhydride by catalytic oxidation of naphthalene and treating said phthalic anhydride with catalysts capable of splitting off carbon dioxid, the step of preventing poisoning of the catalyst splitting off carbon dioxid by converting the sulphur and sulphur compounds in the impure naphthalene employed as initial material into a non-volatile form and then carrying out said catalytic oxidation in the vapour phase.

In testimony whereof we have hereunto set our hands.

JOHANNES BRODE.
ADOLF JOHANNSEN.